(12) United States Patent  (10) Patent No.: US 9,297,915 B2
Koh et al.  (45) Date of Patent: Mar. 29, 2016

(54) VIBRATION DETECTOR AND METHOD

(75) Inventors: Chan Ghee Koh, Singapore (SG); Khac Kien Vu, Singapore (SG)

(73) Assignee: National University of Singapore, Singapore (SG)

( * ) Notice: Subject to any disclaimer, the term of this patent is extended or adjusted under 35 U.S.C. 154(b) by 420 days.

(21) Appl. No.: 13/825,550

(22) PCT Filed: Sep. 22, 2011

(86) PCT No.: PCT/SG2011/000326
§ 371 (c)(1),
(2), (4) Date: Mar. 21, 2013

(87) PCT Pub. No.: WO2012/039681
PCT Pub. Date: Mar. 29, 2012

(65) Prior Publication Data
US 2013/0180336 A1    Jul. 18, 2013

Related U.S. Application Data

(60) Provisional application No. 61/385,178, filed on Sep. 22, 2010.

(51) Int. Cl.
*G01V 1/18* (2006.01)
*G01H 13/00* (2006.01)
*G01H 1/12* (2006.01)
(Continued)

(52) U.S. Cl.
CPC .. *G01V 1/16* (2013.01); *G01H 1/12* (2013.01); *G01H 13/00* (2013.01); *G01V 1/162* (2013.01); *G01V 1/008* (2013.01)

(58) Field of Classification Search
CPC ......... G01V 1/16; G01V 1/162; G01V 1/008; G01H 13/00; G01H 1/12
USPC ................... 73/579, 514.34, 504.12; 340/690
See application file for complete search history.

(56) References Cited

U.S. PATENT DOCUMENTS 1,806,871 A   5/1931   Bower
4,333,029 A   6/1982   Kolm et al.
4,637,246 A   1/1987   Lombard et al.
(Continued)

FOREIGN PATENT DOCUMENTS

CN   101344446 A   1/2009
GB   973106        10/1964
(Continued)

OTHER PUBLICATIONS

Sugawara, Machine translation of JP 2002-242987 A, pp. 1-17.*
(Continued)

*Primary Examiner* — Laura Martin
*Assistant Examiner* — Rose M Miller
(74) *Attorney, Agent, or Firm* — Innovation Capital Law Group, LLP; Vic Lin

(57) ABSTRACT

A vibration detector (100) is disclosed herein. In a first embodiment, the vibration detector (100) includes a support member (300, 302) arranged to vibrate, and a sensor (207) arranged to detect a vibration frequency of the support member (300, 302). The vibration frequency to be detected is dependent on the support member's mechanical structure, in which the support member's mechanical structure is mechanically reconfigurable to vary the vibration frequency to be detected by the sensor (207).

22 Claims, 14 Drawing Sheets

(51) Int. Cl.
*G01V 1/16* (2006.01)
*G01V 1/00* (2006.01)

(56) References Cited

U.S. PATENT DOCUMENTS

| | | | |
|---|---|---|---|
| 5,402,684 | A | 4/1995 | Engeler et al. |
| 5,539,387 | A | 7/1996 | Gitlis et al. |
| 5,625,348 | A | 4/1997 | Farnsworth |
| 5,739,626 | A | 4/1998 | Kojima et al. |
| 6,043,588 | A | 3/2000 | Tabota et al. |
| 6,098,461 | A | 8/2000 | Okada |
| 6,263,734 | B1 | 7/2001 | Fujii |
| 6,354,152 | B1 | 3/2002 | Herlik |
| 6,530,276 | B2 | 3/2003 | Tajika et al. |
| 6,681,631 | B2 | 1/2004 | Apel |
| 7,005,993 | B2 | 2/2006 | Webb et al. |
| 7,626,316 | B2 | 12/2009 | Kozinsky et al. |
| 2005/0052096 | A1 | 3/2005 | Yamashita |
| 2005/0082948 | A1 | 4/2005 | Waki et al. |
| 2005/0082949 | A1 | 4/2005 | Tsujiura |
| 2007/0073502 | A1 | 3/2007 | Umeda |
| 2009/0021117 | A1 | 1/2009 | Ueda et al. |
| 2009/0195222 | A1 | 8/2009 | Lu et al. |
| 2009/0322183 | A1 | 12/2009 | Kawakubo et al. |

FOREIGN PATENT DOCUMENTS

| | | |
|---|---|---|
| JP | 2002-242987 | 8/2002 |
| WO | 2006079239 A1 | 8/2006 |
| WO | 2008017090 A2 | 2/2008 |
| WO | 2009002494 A1 | 12/2008 |
| WO | 2010057247 A1 | 5/2010 |

OTHER PUBLICATIONS

International Search Report & Written Opinion; Mailing Date Nov. 9, 2011, for PCT/SG2011/000326, Filed on Sep. 22, 2011.

H. Tajikaa, K. Nishiharaa, K. Nomuraa, T. Ohtsuchib and M. Toujic, "Three-axis earthquake sensor using direct bonding of LiNbO3 crystals", Sensors and Actuators A: Physical, 2000, 82(1-3), pp. 89-96.

A.T. Kolliasa and J.N. Avaritsiotis, "A study on the performance of bending mode piezoelectric accelerometers", Sensors and Actuators A: Physical, 2005, 121(2), pp. 434-442.

S. I. Kutakov and I. A. Maslov, "Use of the piezoelectric hydrophone for detecting infra-low-frequency seismoacoustic fields", Physics of Wave Phenomena, 2010, 18(1), pp. 75-80.

Haichang Gu, Yashar Moslehy, David Sanders, Gangbing Song and Y L Mo, "Multi-functional smart aggregate-based structural health monitoring of circular reinforced concrete columns subjected to seismic excitations", Smart Materials and Structures, 2010, 19(6), 7 pages.

Suresh Bhalla and Chee Kiong Soh, "High frequency piezoelectric signatures for diagnosis of seismic/blast induced structural damages", NDT & E International, 2004, 37(1), pp. 23-33.

Y. Nemirovsky, A. Nemirovsky, P. Muralt and N. Setter, "Design of novel thin-film piezoelectric accelerometer", Sensors and Actuators A: Physical, 1996, 56(3), pp. 239-249.

H. S. Tzou, S. Pandita, "A multi-purpose dynamic and tactile sensor for robot manipulators", Journal of Robotic Systems, 2007, 4(6), pp. 719-741.

Zhaochun Yang and Qing-Ming Wang, "Transient response of piezoelectric thin-film vibration sensor under pulse excitation", Journal of Applied Physics, 2006, 99, 6 pages.

Shogo Asano and Hideki Matsumoto, "Development of Acceleration Sensor and Acceleration Evaluation System for Super-Low-Range Frequencies", Japanese Journal of Applied Physics, 2001, 40, pp. 3672-3679.

Yoshinobu Ohara, Masaru Miyayama, Kunihito Koumoto and Hiroaki Yanagida, "PZT-polymer piezoelectric composites: A design for an acceleration sensor", Sensors and Actuators A: Physical, 1993, 36(2), pp. 121-126.

Zhi-Cheng Qiua, Hong-Xin Wub and Chun-De Yea, "Acceleration sensors based modal identification and active vibration control of flexible smart cantilever plate", Aerospace Science and Technology, 2009, 13(6), pp. 277-290.

\* cited by examiner

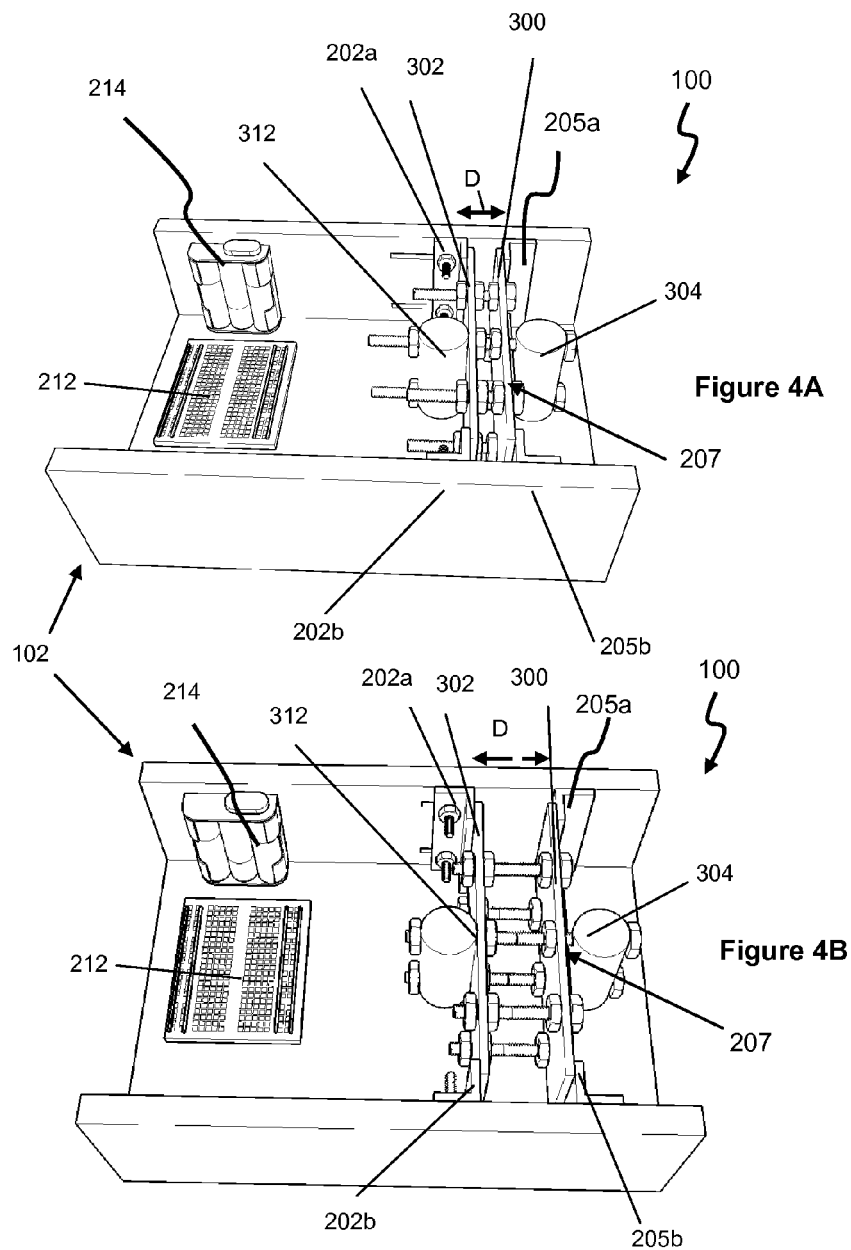

1000

| f (Hz) | Signal (Proposed sensor) | Benchmark Signal (Guralp sensor) | Difference (%) |
|---|---|---|---|
| 0.2 | 3.12 | 2.85 | 8.58 |
| 0.2 | 3.27 | 3.08 | 5.58 |
| 0.4 | 3.52 | 3.48 | 1.29 |
| 0.4 | 3.56 | 4.05 | -13.93 |
| 0.6 | 3.22 | 3.17 | 1.42 |
| 0.6 | 3.50 | 3.60 | -3.01 |
| 0.6 | 3.63 | 4.20 | -15.65 |
| 0.8 | 3.19 | 3.24 | -1.61 |
| 0.8 | 3.50 | 3.65 | -4.47 |
| 0.8 | 3.80 | 4.19 | -10.18 |
| 1 | 3.08 | 3.16 | -2.43 |
| 1 | 3.98 | 4.18 | -5.12 |
| 1 | 5.00 | 5.02 | -0.36 |
| 1 | 5.52 | 5.50 | 0.33 |
| 2 | 3.74 | 3.42 | 8.47 |
| 2 | 5.18 | 4.70 | 9.42 |
| 2 | 6.12 | 5.43 | 11.29 |
| 4 | 4.08 | 3.47 | 14.90 |
| 4 | 5.93 | 5.16 | 13.04 |
| 8 | 4.74 | 4.01 | 15.25 |
| 8 | 5.48 | 4.83 | 11.88 |

Figure 9

VIBRATION DETECTOR AND METHOD

FIELD OF INVENTION

The present invention relates to vibration detection, particularly, but not exclusively, for detecting vibrations of seismic origin.

BACKGROUND

Earthquakes are a fact of life for people living in earthquake prone countries, such as Japan or Mexico, which are normally situated on or lie close to the "Subduction Zones" of tectonic plates. The gradual plate convergence of the tectonic plates in these zones builds strain energy overtime and earthquakes occur when the accumulated energy is suddenly released. As imaginable, earthquakes present immediate hazards to safety, health and economic viability in modern industrial societies. Recent earthquakes highlighted the risks from such cataclysmic events, which affect everything from loss of life to economic growth.

Hence, the desire to mitigate the damages, and more importantly to minimise loss of human lives caused by earthquakes have lead to establishment of early warning systems that typically comprise vibration sensors such as accelerometers, computers and alarms to provide decisive, advanced warnings of those events.

However, such vibration sensors have limited applications and use of highly sophisticated and delicate components means that such sensors tend to be relatively expensive, if not prohibitive, for extensive geographical deployment to provide timely and accurate earthquake detection or other vibration detection.

It is an object of the present invention to provide a vibration detector and method to address the problems of the prior art and/or to provide the public with a useful choice.

SUMMARY

According to a $1^{st}$ aspect of the present invention, there is provided a vibration detector comprising a support member arranged to vibrate, and a sensor arranged to detect a vibration frequency of the support member. The vibration frequency to be detected is dependent on the support member's mechanical structure, in which the support member's mechanical structure is mechanically reconfigurable to vary the vibration frequency to be detected by the sensor.

As it can be appreciated from the described embodiment, by mechanically reconfiguring the support member's mechanical structure, this enables the sensor's vibration frequency to be adjusted for detecting a range of "ground or structural" vibration frequencies. Indeed, the vibration sensor may be used to measure acceleration on structure such as on a ground or wall. Thus, the vibration detector is easily adaptable and configured for a variety of applications.

To mechanically reconfigure the support member, the vibration detector may comprise means for varying the mass of the support member, which may include having attachment means for selectively attaching a plurality of predefined mass to the support member for varying the mass, based on the desired vibration frequency to be detected by the sensor.

Preferably, the support member may include two plates movable relative to each other to facilitate adjustment of the support member's stiffness to vary the vibration frequency, in which the vibration detector may further comprise an attachment device coupled to one of the plates, and a guide slot arranged to guide movement of the attachment device to create the relative movement between the two plates. The attachment device may also be replaceable by another attachment device of a different size to adjust the support member's stiffness, through permitting or inhibiting greater/lesser deformation or flexing of the support member occurring as a result of the detected vibrations. The attachment device may include a bracket.

Yet preferably, the sensor may be reconfigurable to adjust the support member's stiffness, in which the sensor may be replaceable by another sensor of a different size and/or thickness. As an illustration, a thicker sensor disposed on the support member may inhibit further deformation/flexing thereof as opposed to a similar but thinner sensor.

Moreover, the vibration detector may further comprise a further support member arranged in a different orientation as the support member, and a further sensor arranged to detect a further vibration frequency of the further support member. The vibration frequency includes frequency caused by horizontal vibration and the further vibration frequency includes frequency caused by vertical vibration. Advantageously, the vibration detector may be suited for detecting high frequency compressional, longitudinal waves and transverse shear waves, as well as seismic surface waves.

The vibration detector may also comprise a further support member arranged in a same orientation as the support member, and a further sensor arranged to detect a further vibration frequency different from the vibration frequency of the sensor. This allows the vibration detector to advantageously be configured for detecting multiple vibration frequencies based on the requirements of different applications.

According to a $2^{nd}$ aspect of the present invention, there is provided a vibration detector comprising a plurality of slot members arranged to receive a respective one of a plurality of support members and which enables the support members to vibrate. Each support member has a sensor arranged to detect the vibration frequency of the support member. Therefore, the vibration detector is configurable to provide multi-applications vibration monitoring. Any of the vibration detectors described in the foregoing embodiments may be a seismic wave detector.

According to a $3^{rd}$ aspect of the present invention, there is provided a method of varying a vibration frequency of a vibration detector, in which the vibration detector includes a support member arranged to vibrate and a sensor arranged to detect the vibration frequency of the support member, the vibration frequency to be detected being dependent on the support member's mechanical structure. The method comprises mechanically reconfiguring the support member to vary the vibration frequency to be detected by the sensor.

The method may comprise attaching a plurality of predefined mass to the support member to mechanically reconfigure the support member to vary the vibration frequency. Additionally, where the support member includes two plates arranged to be movable relative to each other, the method may subsequently also comprise moving one of the plates to redefine a separating distance therebetween to adjust the support member's stiffness to vary the vibration s frequency.

Further, the vibration detector may also include an attachment device coupled to one of the plates and a guide slot, and accordingly, the method may further include moving the attachment device along the guide slot to move the plate. Yet preferably, the method may comprise replacing the attachment device with another attachment device of a different size to adjust the support member's stiffness.

The method may additionally comprise reconfiguring the sensor to adjust the support member's stiffness, wherein reconfiguring the sensor may comprise replacing the sensor with another sensor of a different size and/or thickness.

These and other aspects of the invention will be apparent from and elucidated with reference to the embodiments described hereinafter.

BRIEF DESCRIPTION OF THE DRAWINGS

Embodiments of the invention are disclosed hereinafter with reference to the accompanying drawings, in which:

FIGS. 4A and 4B show a first method for configuring a sensing frequency of the detector of FIG. 1 by adjusting the distance between adjacent fin elements;

FIG. 9 is a table of results obtained by benchmarking the detector of FIG. 1 against a commercial seismometer, With reference to the Japan Meteorological Agency (JMA) seismic intensity scale.

DETAILED DESCRIPTION

Figure 1:
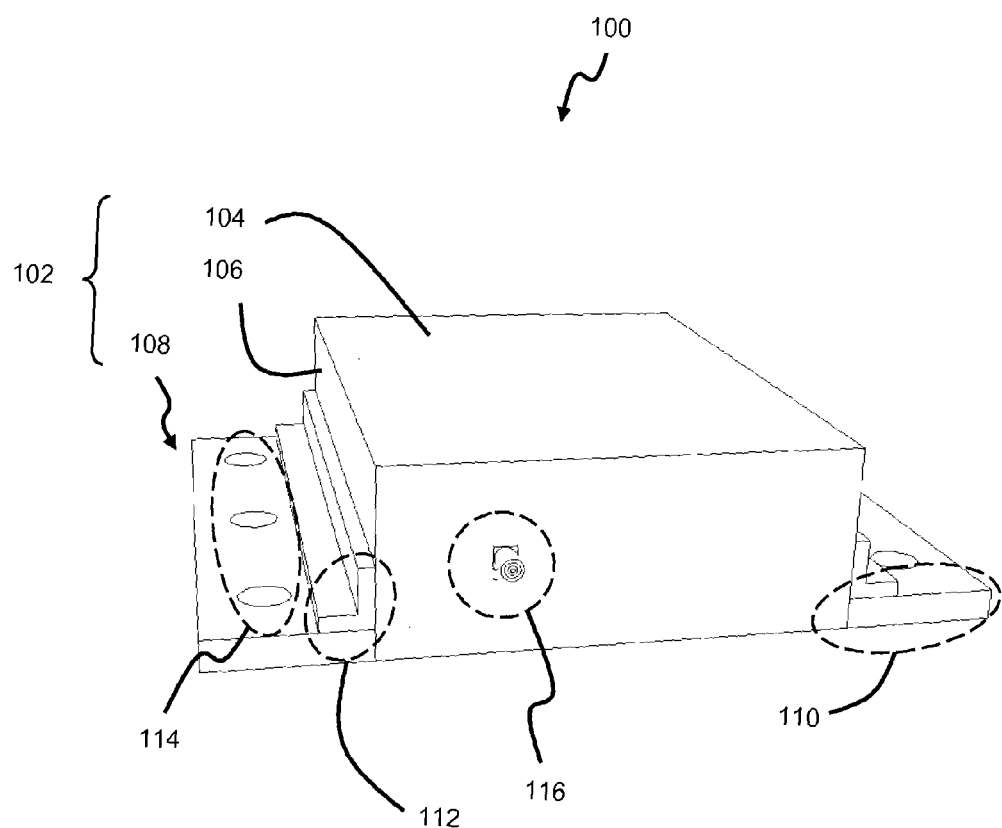
FIG. 1 is a front view of a vibration detector according to an embodiment of the present invention.

FIG. 1 shows a vibration detector 100 according to a first embodiment of the invention. As depicted, the detector 100 comprises a housing 102 having a top cover 104, side walls 106 and a base platform 108. In this embodiment, the detector 100 is configured based on an open architecture concept such that the top cover 104 is advantageously arranged to be easily removable for allowing convenient access to the housing internal for reconfiguration, performing repairs, doing maintenance or carrying out parts replacement.

According to the preferred embodiment, the base platform 108 is formed integral to the side walls 106. The base platform 108 may alternatively be attached to the housing 102 as another discrete section. Additional, the base platform 108 is configured with outwardly protruding sections 110 and reinforced using L-shaped joints 112 attached to the side walls 106. A series of through holes 114 are also provided on exposed portions of the protruding sections 110 to facilitate use of securing means (e.g. bolts or screws) to properly retain or secure the entire detector 100 to a resting platform (not shown) located in a specific area where vibration detection and/or measurement is desired. Further, the top cover 104 is bolted to the side walls 106. The side walls 106 and base platform 108 may alternatively be welded together for added strength.

In deployment scenarios (e.g. on a building rooftop) where water seepage might disrupt the operation of the detector 100, a sealant (e.g. silicon seal) may be applied to the seams between the bolted top cover 104 and the side walls 106 to seal them. This provides waterproofing protection for the electrical components in the detector 100. Another low cost and easily implementable solution may include providing a covering, which is composed of hydrophobic material (e.g. a plastic layer), over the housing 102.

In this embodiment, the housing 102 is formed using lightweight materials, such as aluminium, stainless steel or fiberglass, that exhibit excellent material strength properties. This is preferred so that the detector 100 is structurally resilient against strong vibrations (e.g. generated when earthquakes occur), thereby ensuring the integrity of the electrical components and sensors installed in the detector 100. A coaxial cable connection outlet 116 (although more may be provided as necessary) is available on the front side of the detector 100. It is used for transmitting data generated by the detector 100, and will be elaborated below.

With reference to FIGS. 2A through 2D, the detector 100 is shown with the top cover 104 removed to illustrate internal configurations of the detector 100.

Figure 2A:
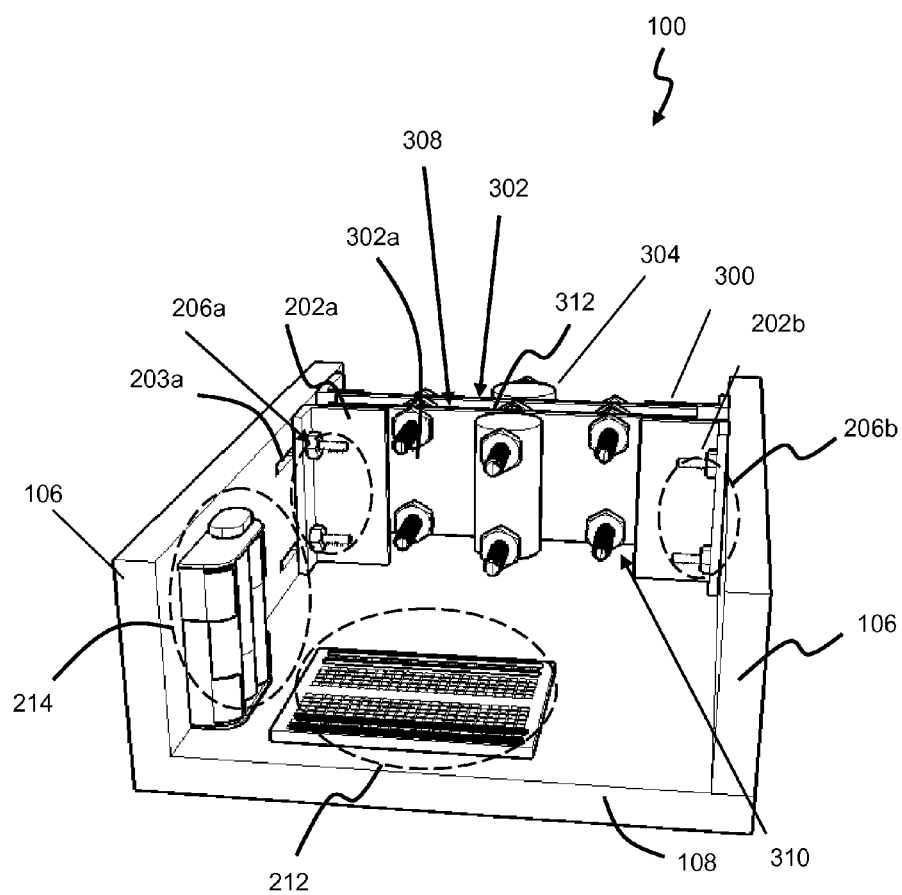
FIGS. 2A to 2C illustrate various perspective views of the detector of FIG. 1.

As shown in FIG. 2A, the detector 100 includes a slotting brackets arrangement comprising a first bracket pair 202a, 202b and a second bracket pair 205a,205b symmetrically arranged vertically (perpendicular to a horizontal plane of the base platform 108), along a length of the housing 102.

Figure 2B:
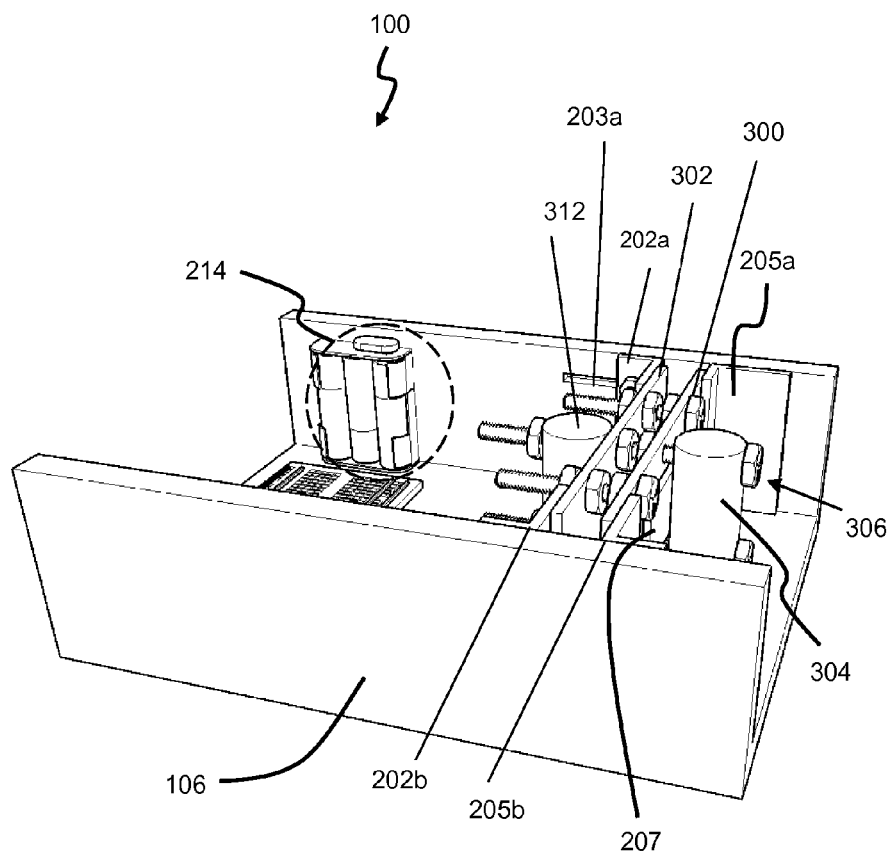
Figure 2C:
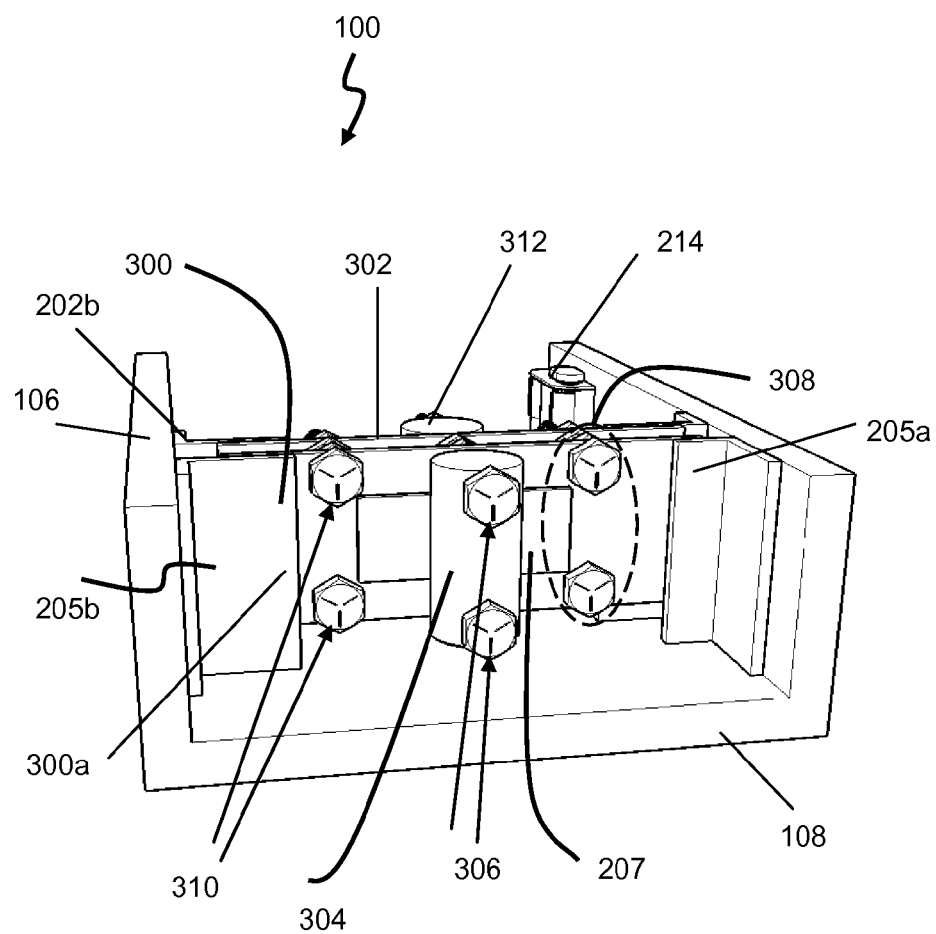

In this embodiment, the second bracket pair 205a,205b is fixedly mounted to the side walls 106 using any suitable means including welding, bolting or being glued thereon and is thus not movable, while the first bracket pair 202a,202b is movably mounted to corresponding linear guide slots 203a, 203b (see FIG. 2D) formed on the side walls 106. As shown in FIGS. 2A and 2B, the detector 100 includes sets of bolts and nuts 206a,206b for movably mounting the brackets 202a, 202b to the respective guide slots 203a,203b. Specifically, each bracket 202a,202b is mounted to the associated guide slots 203a,203b using the bolts and nuts 206a,206b to permit the brackets 202a,202b to be slidably re-positioned (by first loosening the nuts 206a,206b, followed by adjusting the positions of the brackets 202a,202b which are slide or conveyed along the guide slots 203a,203b via the bolts 206a,206b, and re-tightening the nuts 206a,206b on completion) when desired or necessary.

The detector 100 includes a support member and in this embodiment, the support member includes a fixed fin element 300 attached to the second bracket pair 205a,205b and a movable fin element 302 attached to the first bracket pair 202a,202b. Each of the fixed fin element 300 and the movable fin element 302 takes a form of a rectangular plate which is about 1 millimeter thick (although other form factors, thickness and shapes may also be used based on the requirements of different applications) and having its ends attached to respective second and first bracket pairs 205a,205b,202a, 202b using any appropriate means including welding, bolting or being glued thereon.

The detector 100 further includes a piezoelectric patch 207 adhered (for example glued on) to an outer face 300a of the fixed fin element 300. The detector 100 further includes a first mass 304 bolted to a central portion of the fin element 300 via bolts and nuts 306 so that the first mass 304 overlaps the piezoelectric patch 207. The detector 100 further includes sets of bolts and nuts 308,310 spaced from the first mass 304 which are used to couple the fixed fin element 300 to the movable fin element 302.

The detector 100 further includes a second mass 312 bolted to a central portion of an outer face 302a of the movable fin element 302.

The fixed and movable fin elements 300,302 are each configured to vibrate in response to surrounding vibrations, for example, the ground to which the detector 100 is mounted moves and the vibration of the fin elements 300,302 is detected by the piezoelectric patch 207 (serving as an associated sensor). Each fin element 300,302 is made of aluminium which is durable, lightweight and ductile, and enables the fin elements 300,302 to vibrate in response to the surrounding vibrations. To elaborate further by example, when an earthquake occurs, the ground accelerations (i.e. vibrations) detected by the detector 100 are transmitted through the base platform 108 to the respective fin elements 300,302 which consequently vibrates in response to the ground accelerations (along the width or length of the fin elements 300,302) based on the intensity of the ground accelerations. The vibration of the fixed and movable fin elements 300,302 in turn causes the piezoelectric patch 207 to deform and the deformation is converted into electrical potential differences (as a result of the "piezoelectric effect"). The potential differences registered are transmitted as electrical signals (i.e. data) that can be processed to determine the severity of the ground accelerations and thus, provide warnings of an impending earthquake.

To facilitate transmission of the electrical signals, the piezoelectric patch 207 is electrically wired via electrodes (not shown) to the coaxial cable connection outlet 116 of FIG. 1. External connection means (e.g. coaxial cables or optical fiber) are connected from the coaxial cable connection outlet 116 to a data acquisition system (not shown) for the transmission of the electrical signals, which is performed wired or wirelessly (via cellular technologies such as UMTS, HSPA or LTE) or using any known communication techniques. The data acquisition system is preferably located in another site which serves as a central monitoring station, remote from where the vibration detection detector 100 is installed. In addition to providing greater equipment survivability against unexpected events (e.g. earthquake), this approach allows extremely basic configuration, in terms of interfaces and components, for the detector 100 to advantageously facilitate large scale deployment, since only one data acquisition system for collating and analysing the transmitted data is required. According to the preferred embodiment, the detector 100 is configured to automatically "data-push" (i.e. transmit) the data generated by the piezoelectric patch 207. The data measured may not be further processed; they are simply transmitted in raw generated form to the data acquisition system.

Alternatively, the data acquisition system is configured as an internal unit installed in the detector 100. Through the "data-pushing" configuration, the data acquisition system receives data from the fin elements 300,302 when ground accelerations are detected. The data are then digitised, collated and compressed into data packets. The data packets are then transmitted as telemetry signals to the central monitoring station which consists of other sophisticated systems for performing further analysis. Transmission links between the data acquisition system and central monitoring system can be realised using any connection means as described.

As shown in FIG. 2A, the detector 100 includes a signal conditioning circuit 212 and a battery power supply 214. The signal conditioning circuit 212 comprises amplifiers (not shown), among other onboard components, to amplify the signals produced by the piezoelectric patch 207 before forwarding them to the data acquisition system.

The battery power supply 214 is for providing electric energy to operate the signal conditioning circuit 212 and for transmitting the signals from the piezoelectric patch 207.

Figure 3:
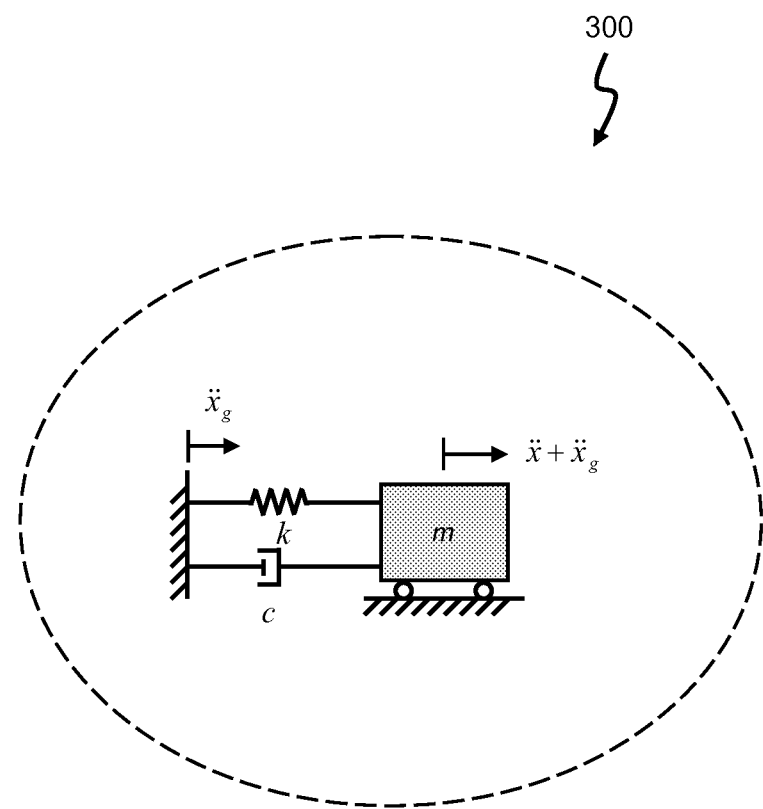
FIG. 3 shows a concept of a single-degree-of-freedom system, on which the detector of FIG. 1 is based.

The detector 100 is developed based on the concept of single-degree-of-freedom system (refer to FIG. 3). Specifically, sensitivity of the vibration of the fixed and movable fin elements 300,302 is adjustable, in which the underlying principle is governed by Newton's Second Law of Motion and expressed as an equation:

$$m\ddot{x} + c\dot{x} + kx = -m\ddot{x}_g \quad (a)$$

where the terms 'm', 'c', 'k', 'x', '$\dot{x}$', '$\ddot{x}$' and '$\ddot{x}_g$' respectively represent a mass, the damping coefficient, the stiffness, the displacement of the mass relative to a base, the first time derivative of 'x', the second time derivative of 'x', and the displacement of the base. When the base vibrates, the dynamic response of the mass is largely dependent on the system properties, which include the mass ('m'), the stiffness ('k') and the damping coefficient ('c').

Further, the mechanical resonance frequency, f, of each fin element 300,302 may be calculated using the following equation:

$$4\pi^2 f^2 = k/m \quad (b)$$

It is to be appreciated that the mass and stiffness of the fin elements 300, 302 are related through a mathematical relationship, involving the geometric parameters of each fin element 300,302, expressed as: the mass being proportional to volume of the fin (mass ('m')=density ('D')×length ('l')× height ('h')×thickness ('t')), while the stiffness ('k') is expressed as:

$$k = Eht^3/12l \quad (c)$$

where 'E' represents the Young's modulus of a material from which the fin elements 300,302 are formed. It is apparent from equations (b) and (c) that, when the mass ('m') is increased, the corresponding stiffness ('k') is also increased (although not necessarily in a linearly proportional manner).

In particular, changing the stiffness and/or mass of the fixed and/or movable fin elements 300,302 affects the associated sensitivity of vibration of the fin elements 300,302 and thus, determines the sensing frequency of the piezoelectric patch (and hence, the detection frequency of the detector 100). The range of sensing frequencies of the detector 100 is therefore adjustable by using any or combination of the methods illustrated in FIGS. 4 to 6, which are based on equation (a). Accordingly, the methods used to effect a change in the stiffness and/or mass of the fin elements 300,302 include:

(A) Changing a geometrical distance between the fixed and movable fin elements 300,302;
(B) Changing the nature of coupling or connection between the fin elements 300,302 and side walls 106;
(C) Changing the thickness and/or size of the piezoelectric patch 207;
(D) Changing the mass of the fin element 300,302; or
(E) Any of the above combination.

Specifically, FIGS. 4A and 4B illustrate method (A) which adjusts the sensing frequency to be detected by the detector 100 by adjusting a geometric distance 'D' between the fixed and movable fin elements 300,302. As shown, the distance 'D' between the fixed and movable fin elements 300,302 is changed by loosening bolts of the nuts and bolt sets 308,310 and sliding the movable fin element 302 along the guide slots 203a,203b to space the movable fin element 302 further away from the fixed fin element 300 as shown in FIG. 4B. As an illustration, consider the configuration of the two fin elements 300,302, each of two millimeter thickness. In a first scenario where the two fin elements 300,302 are closely arranged as shown in FIG. 4A, the mechanical resonance frequency is found to be $f_1=8/C$, where C represents a variable. In a second scenario where the two fin elements 300,302 are now separated by four millimeters, the mechanical resonance frequency is $f_2=110/C$, which is approximately fourteen times higher than $f_1$. In this way, adjusting the distance changes the mechanical structure (i.e. stiffness) of the support member in the form of the fin elements 300,302 in order to vary the sensing frequency of the detector 100.

Figure 5A:
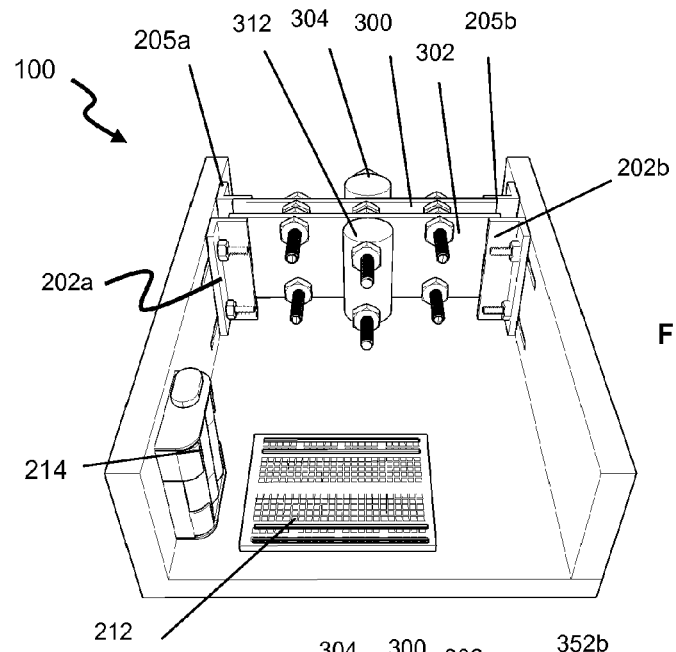
FIGS. 5A and 5B show a second method for configuring a sensing frequency of the detector of FIG. 1 through changing the coupling between the fin elements and side plates.
Figure 5B:
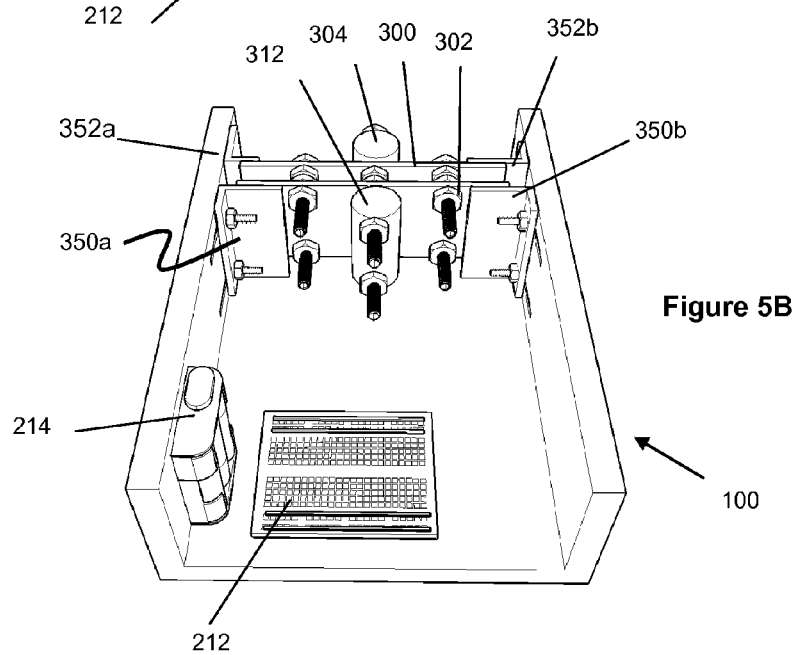

FIGS. 5A and 5B illustrate method (B) of reconfiguring the coupling between the fin elements 300,302 and side walls 106 to adjust the stiffness of the fin elements 300,302. As shown in FIG. 5A, the structure of the L-shaped brackets 202a,202b, 205a,205b creates a certain stiffness of the fin elements 300, 302 which enable the fin elements to vibrate or flex in response to surrounding vibrations. By replacing the L-shaped brackets 202a,202b,205a,205b with modified L-shaped brackets 350a,350a,352a,352b having a greater area of contact with the fin elements 300,302 as depicted in FIG. 5B, the stiffness of the fin elements 300,302 is thus increased accordingly since the fin elements 300,302 are now more inhibited from deformation. In this way, the mechanical structure of the fin elements 300,302 is thus reconfigured to vary the sensing frequency of the detector 100.

Figure 6A:
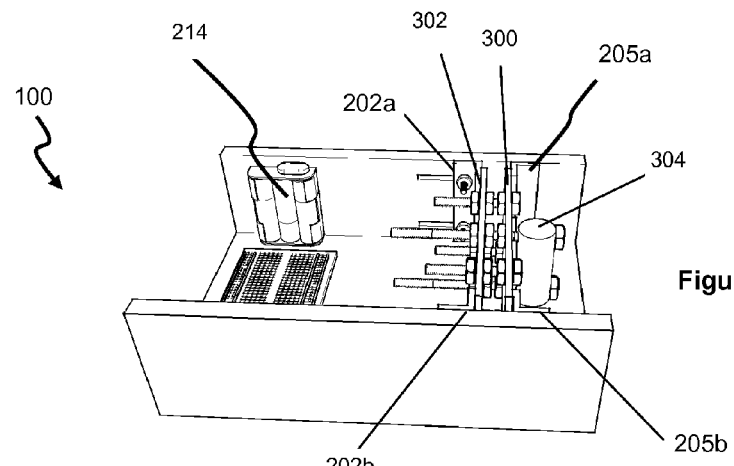
FIGS. 6A, 6B and 6C show a third method for configuring a sensing frequency of the detector of FIG. 1 by adding or removing masses to the fin elements.
Figure 6B:
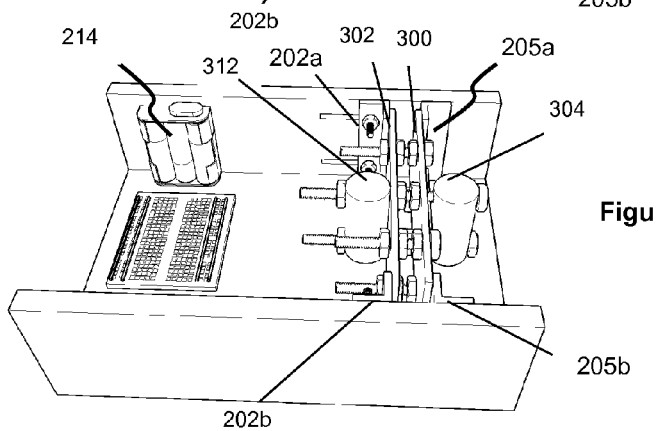
Figure 6C:
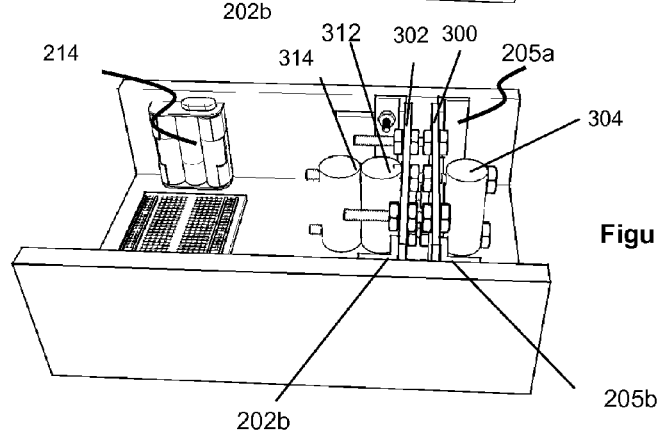

FIGS. 6A to 6C illustrate the method (D) which mechanically reconfigures the structure of the fin elements 300,302 by adding or removing masses 304,312 to the fin elements 300, 302 as necessary. Based on a desired vibration frequency to be detected by the detector 100, a specific number of masses 208 are attached to or removed from a fin element 300,302 for changing the vibration frequency. The exact number of masses 208 used may depend on a number of factors including the weighting required for effecting the desired change in the /5 stiffness of the fin element .300,302, the material from which the masses 208 are formed and also the amount of available practical space within the housing 102 for carrying out the desired re-configuration. For example, starting from FIG. 4B, which includes the masses 304,312 as shown in FIG. 2B, the mass 312 is removed from the movable fin element 302 and this reduces the mass of the movable fin element 302 and thus, reduces the mass of the entire detector 100. On the other hand, if a further mass 314 is added to the mass 312 of the movable fin element 302, this changes the mechanical structure of the movable fin element 302 and thus, the support member. Adding the further mass 314 increases the stiffness of the movable fin element 302 and thus, consequently affects the sensing frequency of the piezoelectric patch 207.

As mentioned above, the stiffness and/or mass of the fin elements 300,302 may also be altered by changing the thickness of the piezoelectric patch 207. Particularly, this includes reconfiguring (i.e. replacing, adding or removing) the piezoelectric patch 207, specifically in terms of its size and thickness. For instance, using a thicker piezoelectric patch 207 (e.g. comprising a plurality of stacked piezoelectric patches 207) correspondingly increases the stiffness of the fin element 300 since it is somewhat more restrained from flexing/deforming due to the added thickness. The converse is true for a relatively thinner piezoelectric patch 207. The number of piezoelectric patch 207 to be further added to or to replace existing ones is dependent on factors such as the change in stiffness required for each fin element 300,302 or the dimensions of one such piezoelectric patch 207 as available from the corresponding manufacturers. Moreover, the stiffness of a fin element 300,302 is also determined by the material from which it is formed. A fin element 300,302 formed using a harder material is stiffer while one formed using a softer material is less stiff in comparison.

Figure 8:
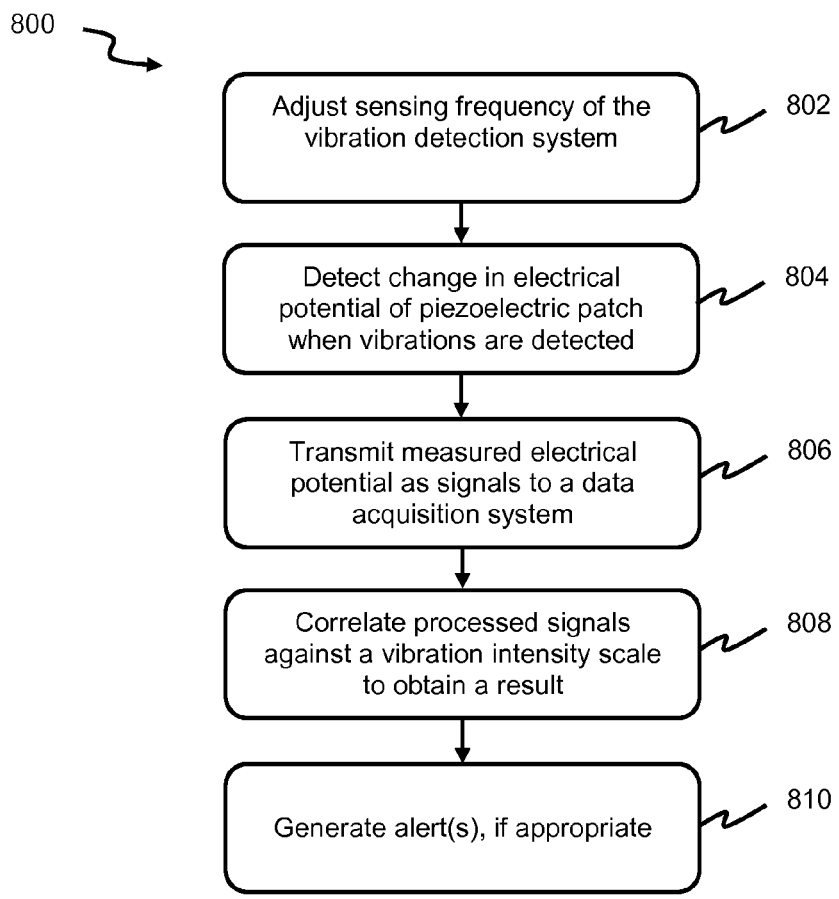
FIG. 8 is a flowchart illustrating a method of detecting vibrations using the detector of FIG. 1.

An operation of the detector 100 for detecting vibrations will now be described with reference to FIG. 8. At step 802, a user (not shown) of the detector 100 adjusts the sensing frequencies by mechanically reconfiguring the individual fin elements 300,302 using any or a combination of the methods described above and as illustrated in FIGS. 4 to 6 to adjust the associated vibration frequencies the user wishes to detect using the detector 100. The detector 100 is next mounted to a surface at a locality for detecting vibrations and is left there.

At step 804, when the surface shakes, the vibrations are picked up by the fin elements 300,302 which vibrate correspondingly and this causes the piezoelectric patch 207 to deform in response to the vibration. The deformation of the piezoelectric patch 207 in term creates an electrical potential due to the piezoelectric effect and this potential is sent to the signal conditioning circuit 212 for onward transmission to the data acquisition system as electrical signals at step 806. At step 808, the electrical signals are then processed by the data acquisition system to obtain a result, which is correlated against a calibrated vibration or seismic intensity scale (e.g. the Richter magnitude scale or Mercalli intensity scale) to determine a factor that is representative of the intensity of the detected vibrations. If it is ascertained that the factor exceeds a predetermined safety limit that warrants a warning to be raised (e.g. possible large earthquake), an alert is generated at step 810. Generating the alert may comprise for example, publicly displaying a warning message on a screen to users, sounding a high-pitch audible alert or activating flashing hazard lights.

A table 1000 in FIG. 9 shows results from tests conducted to benchmark (with reference to the Japan Meteorological Agency (JMA) seismic intensity scale) the tremor performance of the detector 100 against a commercial seismometer (e.g., an analogue model CMG-5T from Guralp Systems Limited of Reading, UK). Both the detector 100 and Guralp seismometer Were assessed under similar testing conditions. The results shoW that the maximum measured signal deviation of the detector 100 versus the Guralp seismometer is approximately ±15%, while the mean absolute difference is approximately 7.5%. The results show that the prototype 800 is therefore capable of comparable performance as the Guralp seismometer.

As it is apparent, the detector 100 provides an easy way of reconfiguring the sensing frequency of the piezoelectric patch 207 and thus, the detector 100. Such a detector 100 is also inexpensive to make and deploy and since its sensing frequency is reconfigurable, it is able to be deployed for a wide range of applications.

Applications for the detector 100 include usage in seismology, hazard mitigation and civil engineering. Particularly, the detector 100 is configured to measure large or minute accelerations of buildings or other civil engineering structures due to earthquakes. For example, the detector 100 may be deployed for monitoring tremor occurrences in low-seismicity regions such as Singapore, Malaysia, Thailand, Southern China region (including Hong Kong), Korea, Western Europe, Eastern America., the Middle East and etc. According to an embodiment, the detector 100 is a seismic wave detector. Optionally, the detector 100 is also suited for monitoring abnormal vibrations arising from other dynamic events such as landslides or even vibrations cause by machinery at a factory floor.

The described embodiment is not to be construed as limitative. For example, in the described first embodiment, the first bracket pair 202a,202b is slidable along the guide slots 203a,203b but other ways are envisaged. Also, instead of using bolts and nuts for attaching the fin elements 300,302 to each other or the masses 304,312,314 to the fin elements 300,302, other forms of attachment means are envisaged.

Further, each fin element 300,302 and respective bracket 202a,202b,205a,205b pairs may also be replaced by a contiguous piece of C-shaped member (not shown). In the described embodiment, the masses 304,312,314 are illustrated as cylindrical in shape. However, this may not be so and other shapes and sizes are envisaged to create the desired loading effect. The masses 304,312,314 may also be configured such that discrete weight portions are selectively receivable as necessary.

The support member of the described embodiment includes two fin elements 300,302 but it should be apparent that only the fixed fin element 302 is needed. In such a case, the support member/fin element 302 may be mechanically reconfigured by varying the mass 304 or using the other methods suggested earlier.

In addition to the piezoelectric patch 207, a second similar piezoelectric patch (not shown) may also be attached to an inner face of the same fin element 302 to alter its stiffness, and consequently the sensitivity of detection. Optionally, electroactive polymers such as dielectric elastomers, instead of piezoelectric materials, may be used in place of the piezoelectric patch 207.

Aluminium is used as an example of the material for the fin elements 300,302 but it would be apparent that other materials are possible.

Figure 2D:
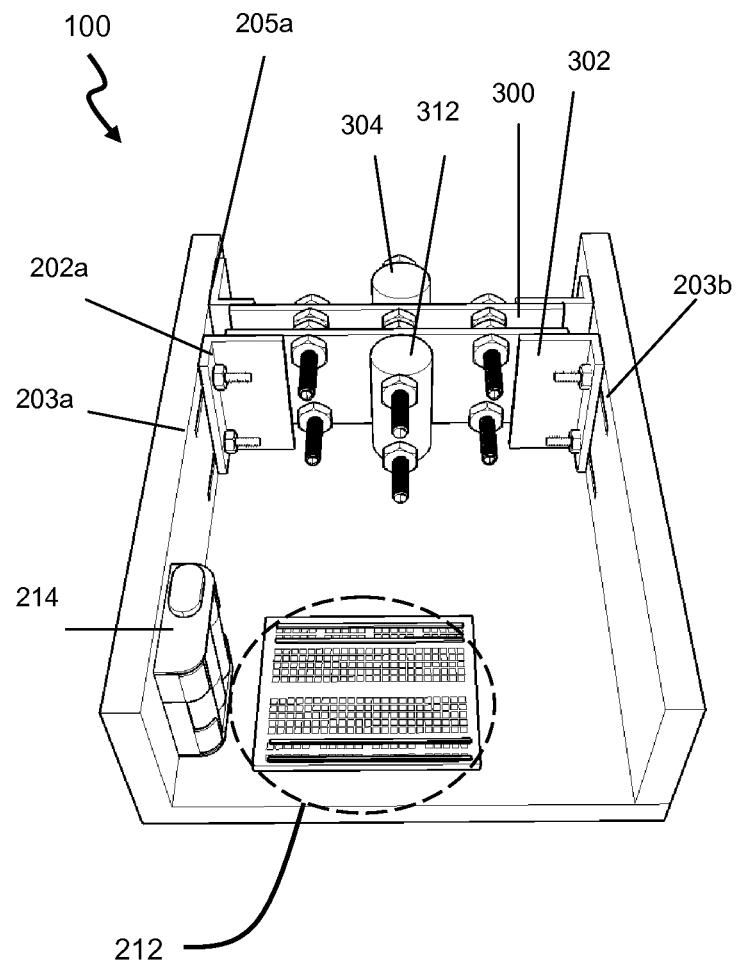
FIG. 2D illustrates an internal configuration of a first variation of the vibration detector of FIG. 1.

The described embodiment discloses using the first and second bracket pairs 202a,202b,205a,202b to support the fin elements 302,300 but the fin elements 302,300 may just be supported at one edge/end in a cantilever arrangement. This variation is shown in FIG. 2D which illustrates one of the brackets 202b,205b being removed so that the other brackets 202a,205a are used to support the movable fin element 302 and the fixed fin element 300. Needless to say, this also changes the mechanical structure of the fin elements 300,302 in particular the stiffness and thus, this variation may be used to tune a desired sensing frequency for the detector 100.

Figure 2E:
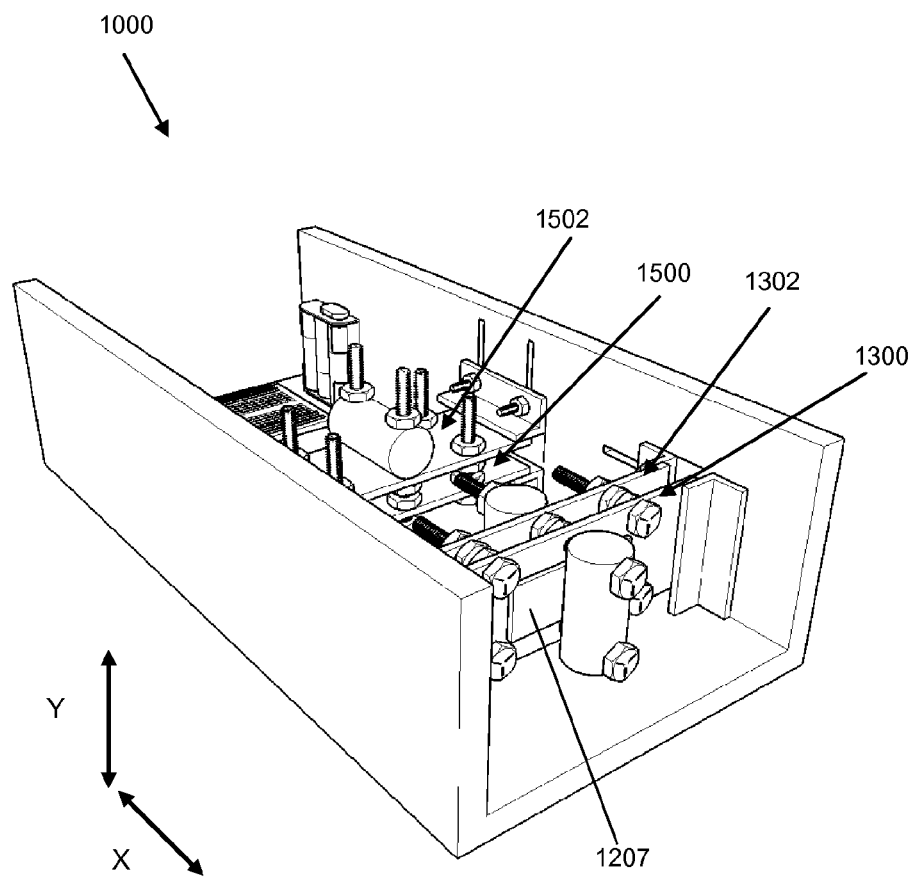
FIG. 2E illustrates an internal configuration of a second embodiment of the invention.

The detector 100 of FIG. 1 is particularly useful for detecting horizontal vibrations (e.g. earth quakes). However, it is envisaged that the detector 100 may be adapted to detect both horizontal and "vertical" vibrations and FIG. 2E illustrates such a detector 1000 which is a second embodiment of the invention.

Like parts of the second embodiment uses like references with the addition of 1000.

The detector 1000 includes a first sensor arrangement having a fixed fin element 1300 and a movable fin element 1302 arranged in a similar arrangement as the detector 100 of the first embodiment—i.e. the movable fin element 1302 is movable horizontally. The detector 1000 also includes a piezoelectric patch 1207 adhered to the fixed fin element 1300 just like in the first embodiment. In addition, the detector 1000 also includes a second sensor arrangement including a first horizontal fin element 1500 (horizontal in the sense that the fin element 1500 is parallel to the plane of the base platform of the housing) and a second horizontal fin element 1502 arranged above the first horizontal fin element 1500. The first horizontal fin element 1500 also carries a piezoelectric patch (not shown) similar to the piezoelectric patch 207 of the detector 100 but configured to detect a desired "vertical" vibration frequency. The second horizontal fin element 1502 is coupled to and movable relative to the first horizontal fin element 1500 in the same manner as the first sensor arrangement (and thus, the sensor arrangement of the detector 100 of the first embodiment) but vertically. Likewise, the mechanical structure of the horizontal fin elements 1500,1502 are reconfigurable in order to vary the "vertical" vibration frequency to be detected. In this way, the detector 1000 is particularly useful for detecting both the horizontal vibrations as depicted by arrow X and vertical vibrations as depicted by arrow Y, of FIG. 2E.

Further, the detector 1000 is suited to detect high frequency compressional waves that are longitudinal in nature for instance, P-waves (i.e. primary waves) as well as for detecting shear waves that are transverse in nature, for example S-waves (i.e. secondary waves with a lower frequency relative to P-waves). Further, such a detector 1000 may also detect seismic surface waves such as Rayleigh waves or Love waves.

Figure 7:
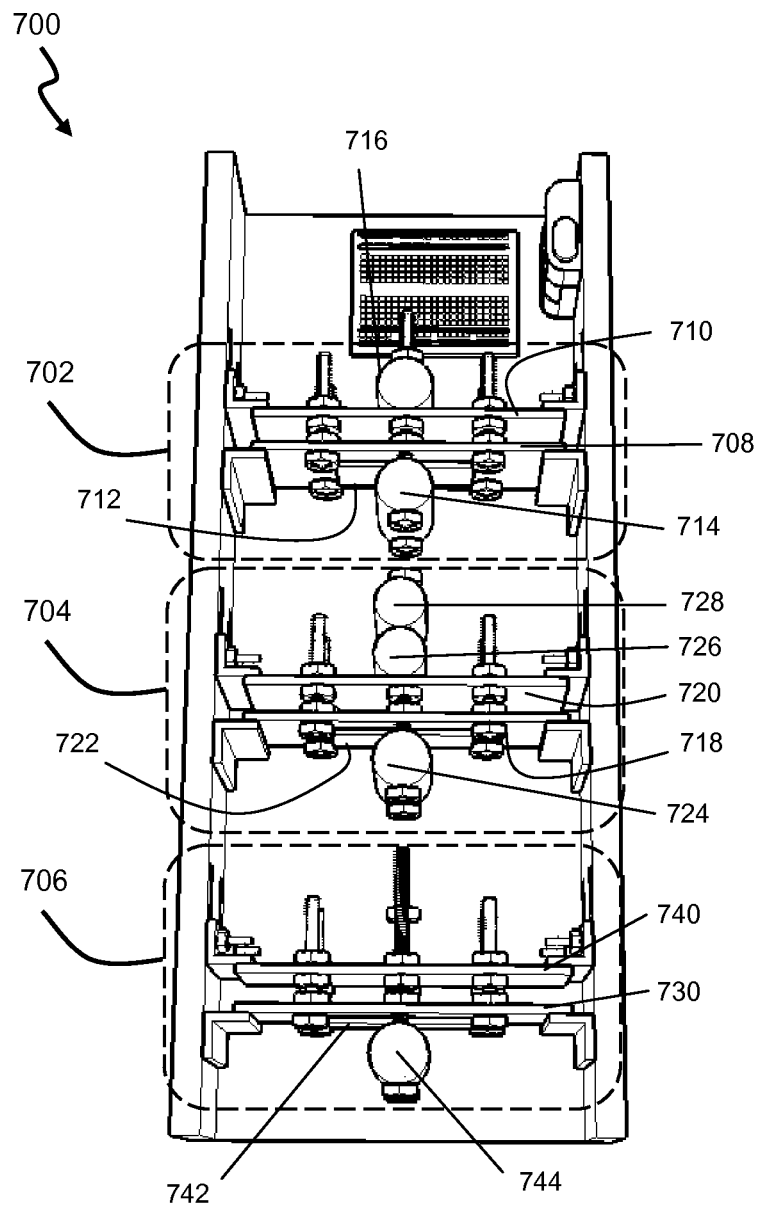
FIG. 7 shows a third embodiment of the invention.

FIG. 7 shows a third embodiment of the invention which includes a multi-frequency vibration detector 700. As shown in FIG. 7, the detector 700 includes a plurality of sensor arrangements 702,704,706 with each sensor arrangement configured to detect a different vibration frequency and thus, expands the scope of application of the detector 700. Each of the sensor arrangements 702,704,706 are conceptually similar to the sensor arrangement of FIG. 2A comprising the fixed and movable fin elements 300,302 and the piezoelectric patch 207 and thus, it would suffice to briefly describe that the first sensor arrangement 702 includes a first pair of fixed and movable fin elements 708,710 and a first piezoelectric patch 712 adhered to the fixed fin element 708. Each fin element 708,710 is mounted with a predefined mass member 714,716 in order to configure the mechanical structure of the fin elements 708,710 so as to tune the first piezoelectric patch 712 to sense at a particular first sensing frequency.

The second sensor arrangement 704 is similar to the first sensor arrangement 708 and includes a second pair of fixed and movable fin elements 718,720 and a second piezoelectric patch 722 adhered to the fixed fin element 718. Each fin element 718,720 also includes a predefined mass member 724,726 attached thereto and in addition a further mass member 728 is attached to the movable fin. element 720 and thus, the second sensor arrangement 704 is tuned to detect a. second sensing frequency, different from the first sensing frequency.

The third sensor arrangement 706 includes a third pair of fixed and movable fin elements 730,740 and a third piezoelectric patch 742 adhered to the fixed fin element 730. However, unlike the first and second sensor arrangements, there is no mass member attached to the movable fin element 740 and instead only the fixed fin element 730 is attached with a mass member 744. As a result, the third sensor arrangement comprising the third piezoelectric patch 742 is configured to detect a third sensing frequency which is different from the second and the third sensing frequencies.

As it can be appreciated, the detector 700 of the third embodiment is tuned to detect different desired sensing frequencies using any one or a combination of the described method for adjusting the mechanical resonance frequency as described in the first embodiment. Therefore, the detector 700 is configurable to provide multi-applications vibration monitoring.

Figure 10:
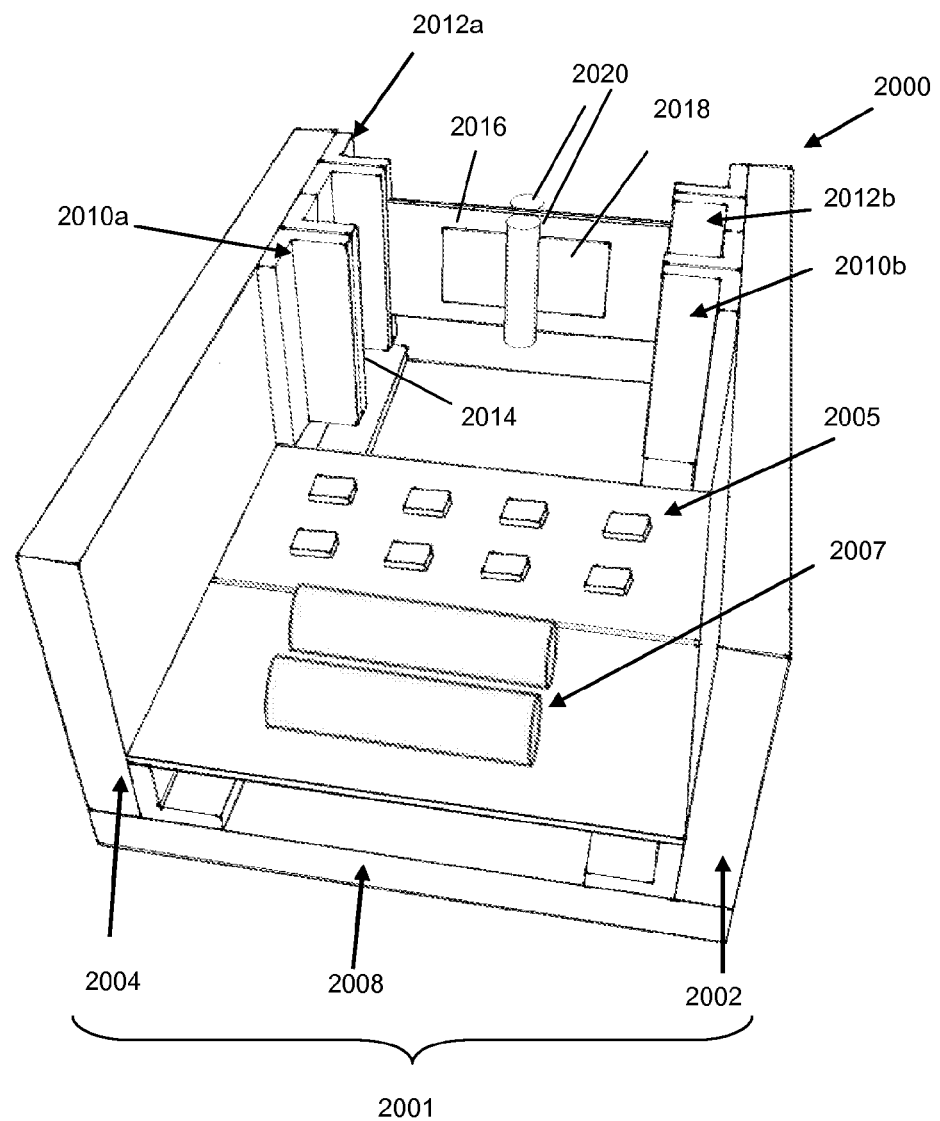
FIG. 10 shows a fourth embodiment of the invention.

FIG. 10 illustrates a fourth embodiment of the present invention which is a multiple slot vibration detector 2000 which includes a housing 2001 having side walls 2002, 2004 coupled to a base 2008. The housing 2001 also includes a cover but this is not shown for ease of explanation. The vibration detector 2000 further includes a signal conditioning circuit 2005 and batteries 2007 for the same reason as in the other embodiments.

The vibration detector 2000 includes a first pair of slotting sockets 2010a,2010a and a second pair of slotting sockets 2012a,2012b. Each slotting sockets 2010a,2010a,2012a, 2012b is formed by two L-shaped members to create a slot therebetween 2014 which is used to receive a support member configured to vibrate such as a fin element 2016. As shown in FIG. 11, the vibration detector 2000 includes a piezoelectric patch 2018 pasted on one side of the fin element 2016 and the operation of the piezoelectric patch 2018 and the fin element 2016 is similar to what has been described in the other embodiments. The vibration detector 2000 also includes two masses 2020 mounted to either side of the fin element 2016 in order to tune the piezoelectric patch 2018 to detect a particular frequency. Since the vibration detector 2000 is provided with a second pair of slotting sockets 2010a,2010a which is not in use, this provides the ability of the vibration detector 2000 to be configured to detect another frequency. This therefore expands the range of applications of the vibration detector 2000. It should be appreciated that the sensing frequencies of the sensor used for the vibration detector 2000 may not be reconfigurable, although it might also be reconfigurable.

Multiple of such detectors 100, 1000, 2000, 700 may be connected (wired or wirelessly) to form a heterogeneous detection network (not shown). Based on an embodiment, the detection network is realised as a self-organising wireless sensor network that communicates using protocols, such as Worldwide Interoperability for Microwave Access (WiMax), that provide mobile wireless access at distances greater than the Wireless Fidelity (Wi-Fi) family of technologies. Under this configuration, each detector 100, 1000, 2000, 700 is treated as an independent network node and permits bidirectional communication between any random neighbouring nodes lying within a configured radio range. Particularly, the underlying routing protocols adopted by the nodes are capable of ad-hoc routing (i.e. independent of infrastructure-mode based routing and resilient to intermediate nodes failure). Therefore, the collated data from each node is forwarded to the central monitoring station through various succeeding adjacent nodes using cooperative routing. Among many others, the pertinent benefits of such a network arrangement of the systems 100 include relative ease of deployment, substantially robust against communication failures (which is of essential importance in earthquake scenarios for continued monitoring), and easily scalable for large scale deployment.

Just like the first embodiment, the second, third and fourth embodiments should not be construed as limitative and the similar comments on the possible variations of the first embodiment also apply to the other embodiments.

While the invention has been illustrated and described in detail in the drawings and foregoing description, such illustration and description are to be considered illustrative or exemplary, and not restrictive; the invention is not limited to the disclosed embodiments.

The invention claimed is:

1. A vibration detector comprising:
a first support member arranged to vibrate; and
a first sensor arranged to detect a first vibration frequency of the first support member, the first vibration frequency to be detected being dependent on the first support member's mechanical structure;
wherein the first support member's mechanical structure is mechanically reconfigurable to vary the first vibration frequency to be detected by the sensor; and
wherein the vibration detector further comprises a second support member arranged in a different orientation as the first support member, and a second sensor arranged to detect a second vibration frequency of the second support member, the first vibration frequency includes frequency caused by horizontal vibration and the second vibration frequency includes frequency caused by vertical vibration.

2. The vibration detector of claim 1, further comprising means for varying the mass of the first support member.

3. The vibration detector of claim 2, further comprising attachment means for selectively attaching a plurality of predefined mass to the first support member for varying the mass.

4. The vibration detector of claim 1, wherein the first support member includes two plates movable relative to each other to adjust the first support member's stiffness to vary the first vibration frequency.

5. The vibration detector of claim 4, further comprising an attachment device coupled to one of the plates, and a guide slot arranged to guide movement of the attachment device to create the relative movement between the two plates.

6. The vibration detector of claim 5, wherein the attachment device is replaceable by another attachment device of a different size to adjust the support member's stiffness.

7. The vibration detector of claim 5, wherein the attachment device includes a bracket.

8. The vibration detector of claim 1, wherein the first sensor is reconfigurable to adjust the support member's stiffness.

9. The vibration detector of claim 8, wherein the first sensor is reconfigurable by being replaceable with another sensor of a different size and/or thickness.

10. The vibration detector of claim 1, further comprising a third support member arranged in a same orientation as the first support member, and a third sensor arranged to detect a third vibration frequency different from the first vibration frequency of the sensor.

11. The vibration detector of claim 1, wherein the vibration detector is a seismic wave detector.

12. A vibration detector comprising:
a plurality of slot members arranged to receive a respective one of a plurality of support members and which enables the support members to vibrate, each support member having a sensor arranged to detect the vibration frequency of the support member; wherein a first one of the slot members is arranged in a different orientation as a second one of the slot members to respectively receive a first one of the support members in a different orientation as a second one of the support members, the vibration frequency to be detected by the sensor associated with the first one of the support members includes frequency caused by horizontal vibration, and the vibration frequency to be detected by the sensor associated with the second one of the support members includes frequency caused by vertical vibration.

13. A method of varying a vibration frequency of a vibration detector, the method comprises:
providing the vibration sensor, the vibration detector including a first support member arranged to vibrate, a first sensor arranged to detect the vibration frequency of the first support member, the first vibration frequency to be detected being dependent on the first support member's mechanical structure, and a second support member arranged in a different orientation as the first support member, and a second sensor arranged to detect a second vibration frequency of the second support member, the first vibration frequency includes frequency caused by horizontal vibration and the second vibration frequency includes frequency caused by vertical vibration;
mechanically reconfiguring the first support member to vary the vibration frequency to be detected by the first sensor.

14. The method of claim 13, further comprises attaching a plurality of predefined mass to the first support member to mechanically reconfigure the first support member to vary the first vibration frequency.

15. The method of claim 13, wherein the first support member includes two plates arranged to be movable relative to each other, and the method further comprises moving one of the plates to redefine a separating distance therebetween to adjust the first support member's stiffness to vary the first vibration frequency.

16. The method of claim 15, wherein the vibration detector further includes an attachment device coupled to one of the plates and a guide slot, and the method further includes moving the attachment device along the guide slot to move the plate.

17. The method of claim 13, further comprises replacing the attachment device with another attachment device of a different size to adjust the first support member's stiffness.

18. The method of claim 13, further comprises reconfiguring the first sensor to adjust the first support member's stiffness.

19. The method of claim 18, wherein reconfiguring the first sensor comprises replacing the first sensor with another sensor of a different size and/or thickness.

20. A vibration detector comprising:
a support member arranged to vibrate; and
a sensor arranged to detect a vibration frequency of the support member, the vibration frequency to be detected being dependent on the support member's mechanical structure;
wherein the support member's mechanical structure is mechanically reconfigurable to vary the vibration frequency to be detected by the sensor;
wherein the support member includes two plates movable relative to each other to adjust the support member's stiffness to vary the vibration frequency; and wherein
the vibration detector further comprises an attachment device coupled to one of the plates, and a guide slot arranged to guide movement of the attachment device to create the relative movement between the two plates, the attachment device being replaceable by another attachment device of a different size to adjust the support member's stiffness.

21. A vibration detector comprising:
a support member arranged to vibrate; and
a sensor arranged to detect a vibration frequency of the support member, the vibration frequency to be detected being dependent on the support member's mechanical structure;
wherein the support member's mechanical structure is mechanically reconfigurable to vary the vibration frequency to be detected by the sensor; and wherein the sensor is reconfigurable to adjust the support member's stiffness.

22. A method of varying a vibration frequency of a vibration detector, the method comprises:
providing the vibration detector, the vibration detector including a support member arranged to vibrate, and a sensor arranged to detect the vibration frequency of the support member, the vibration frequency to be detected being dependent on the support member's mechanical structure, the support member including two plates movable relative to each other to adjust the support member's stiffness to vary the vibration frequency, and further comprising an attachment device coupled to one of the plates, and a guide slot arranged to guide movement of the attachment device to create the relative movement between the two plates, wherein the attachment device is replaceable by another attachment device of a different size to adjust the support member's stiffness;
mechanically reconfiguring the support member to vary the vibration frequency to be detected by the sensor; and
replacing the attachment device with another attachment device of a different size to adjust the support member's stiffness.

* * * * *